(12) United States Patent
Dunn

(10) Patent No.: US 6,698,741 B1
(45) Date of Patent: Mar. 2, 2004

(54) WORKPIECE SUPPORT DEVICE

(75) Inventor: Lawrence F. Dunn, Spring Lake, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 10/039,995

(22) Filed: Jan. 3, 2002

(51) Int. Cl.$^7$ ................................................ B23Q 3/02
(52) U.S. Cl. ...................................... 269/309; 269/234
(58) Field of Search ............................... 269/32, 20, 24, 269/35, 221, 296, 309, 310, 27, 234; 254/104

(56) References Cited

U.S. PATENT DOCUMENTS

| | | | | |
|---|---|---|---|---|
| 3,792,855 A | * | 2/1974 | Bondie ........................ | 269/310 |
| 4,067,564 A | * | 1/1978 | Kobane, Jr. .................. | 269/310 |
| 4,384,707 A | * | 5/1983 | Poot ............................ | 269/32 |
| 4,511,127 A | | 4/1985 | Schron et al. | |
| 4,721,293 A | | 1/1988 | Schron et al. | |
| 4,836,091 A | | 6/1989 | Taylor | |
| 5,713,564 A | * | 2/1998 | Schindler .................... | 269/310 |
| 5,957,443 A | * | 9/1999 | Mascola ...................... | 269/310 |

OTHER PUBLICATIONS

Jergens Inc. Catalog —Work Support Jacks —Website Information dated Dec. 28, 2000, 7 Pages.

Westech Corporation —Work Support Jacks —Website Information dated Dec. 28, 2000, 6 Pages.

* cited by examiner

Primary Examiner—Robert C. Watson
(74) Attorney, Agent, or Firm—MacMillan, Sobanski & Todd, LLC

(57) ABSTRACT

A workpiece support device includes a body having a base portion adapted for mounting on a surface. The workpiece support device also includes a support member mounted on the body so as to be extendable outward relative to the body and away from the base portion, and retractable inward relative to the body and toward the base portion. The support member has an outer end adapted for supporting a workpiece, and it has an inner end. The workpiece support device also includes a cam member having a camming surface. The cam member is mounted on the body so as to be movable in first and second directions. The movement of the cam member in the first direction causes the camming surface to drivingly engage the inner end of the support member and force the support member to extend outward relative to the body. The movement of the cam member in the second direction allows the support member to retract inward relative to the body. The workpiece support device also includes an actuator which when turned on forces the cam member in the first direction, thereby forcing the support member to extend outward relative to the body.

21 Claims, 4 Drawing Sheets

WORKPIECE SUPPORT DEVICE

BACKGROUND OF THE INVENTION

This invention relates in general to devices for supporting workpieces, and in particular to a workpiece support device that may be used for supporting a workpiece held by a fixture during a machining operation.

In many machining operations, the workpiece to be machined is held in place by a fixture. One common type of fixture includes an elevated horizontal frame having a plurality of clamps mounted around the perimeter of the frame. The workpiece is laid on top of the frame and clamped in place. A machining operation, such as cutting, milling or drilling, is performed on the top of the workpiece.

A problem with using this type of fixture is that the center portion of the workpiece is unsupported during the machining operation. As a result, the workpiece may be deflected downward from the force of the machining operation applied to the top of the workpiece. Such deflection may reduce the rate of production, make it difficult to maintaining close tolerances, and increase tool wear.

To address this problem, it is known to position a workpiece support device below the workpiece. A typical workpiece support device includes a body and an upwardly extendable support post having a rest portion on its upper end. The support post is extended upward until the bottom of the workpiece rests on the rest portion of the post. The support post is then locked in position by a locking sleeve or other device. The support post offers resistance to any downward force caused by the machining operation.

However, the locked support post of the typical workpiece support device does not apply upward pressure on the workpiece during the machining operation. This is a disadvantage, because some vibration and chatter of the workpiece may occur during machining, making the machining more difficult. Another disadvantage is that the locking sleeve may become contaminated with dirt, scrap material, or other contaminants after a period of use, which may cause the locking sleeve to lose its ability to function properly.

SUMMARY OF THE INVENTION

This invention relates to a workpiece support device which includes a body having a base portion adapted for mounting on a surface. The workpiece support device also includes a support member mounted on the body so as to be extendable outward relative to the body and away from the base portion, and retractable inward relative to the body and toward the base portion. The support member has an outer end adapted for supporting a workpiece, and it has an inner end. The workpiece support device also includes a cam member having a camming surface. The cam member is mounted on the body so as to be movable in first and second directions. The movement of the cam member in the first direction causes the camming surface to drivingly engage the inner end of the support member and force the support member to extend outward relative to the body. The movement of the cam member in the second direction allows the support member to retract inward relative to the body. The workpiece support device also includes an actuator which when turned on forces the cam member in the first direction, thereby forcing the support member to extend outward relative to the body.

In a preferred embodiment, the workpiece support device includes first and second cam members each having a camming surface. The cam members are mounted on the body so as to be movable between first and second positions relative to one another. The movement of the cam members between the first position and the second position causes the camming surfaces to cooperate to drivingly engage the inner end of the support member and force the support member to extend outward relative to the body. The movement of the cam members between the second position and the first position allows the support member to retract inward relative to the body. The workpiece support device includes at least one actuator which when turned on forces the cam members to move between the first position and the second position, thereby forcing the support member to extend outward relative to the body.

DETAILED DESCRIPTION OF THE PREFERRED EMBODIMENT

Figure 1:
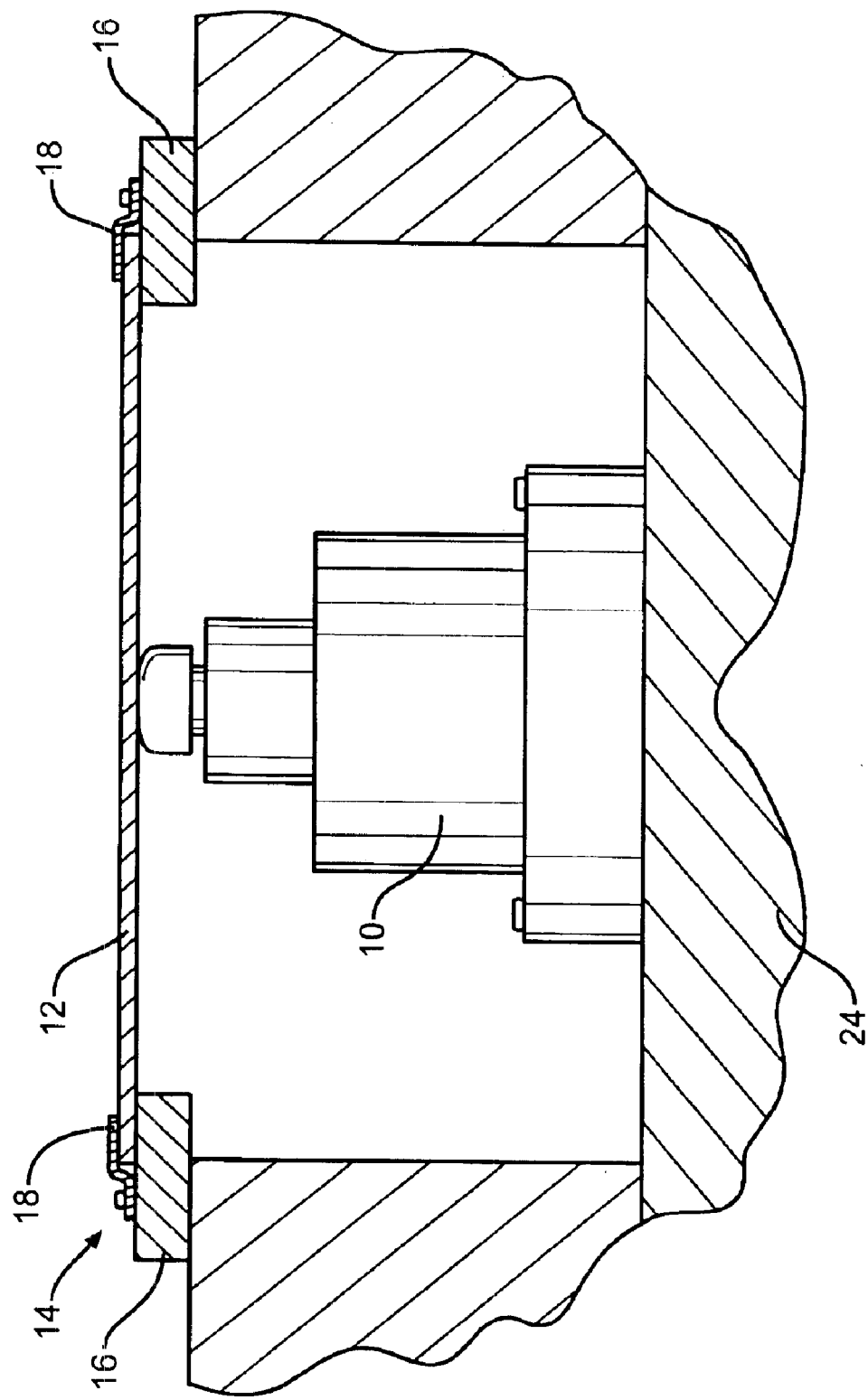
FIG. 1 is a schematic side elevational view showing a workpiece support device according to the invention supporting the bottom of a workpiece held by a fixture.

Referring now to the drawings, there is shown in FIG. 1 a workpiece support device 10 according to the invention supporting the bottom of a workpiece 12 held by a fixture 14. The workpiece support device 10 can be used for supporting a workpiece held by practically any type of fixture that leaves a portion of the workpiece unsupported. It can also be used for supporting a workpiece that is held by means other than a fixture. In the illustrated embodiment, the fixture 14 includes a frame 16 and a plurality of clamps 18 (two of which are shown) mounted around the perimeter of the frame 16. The workpiece 12 is positioned on top of the frame 16 and held in place by the clamps 18.

The workpiece 12 can be practically any type of workpiece having a portion which can advantageously be supported by the workpiece support device 10 of the invention. Generally, the workpiece 12 is supported during a machining operation, such as a cutting, milling or drilling operation, but it can also be supported during other types of operations. Some nonlimiting examples of workpieces that can be supported include different vehicle body parts and engine parts, such as cylinder heads and intake manifolds. FIG. 1 shows a simplified representation of a workpiece 12.

The workpiece support device 10 can be used to support any portion of a workpiece 12 in need of support. For example, the workpiece portion may be a thin portion, an unsupported center portion, an unsupported edge portion, or any other portion that would be deflected by the force of a machining operation. In the illustrated embodiment, the center portion of the workpiece is left unsupported by the frame, so the workpiece support device 10 is used to support the lower surface of the center portion while a machining operation is performed on the top surface.

Figure 2:
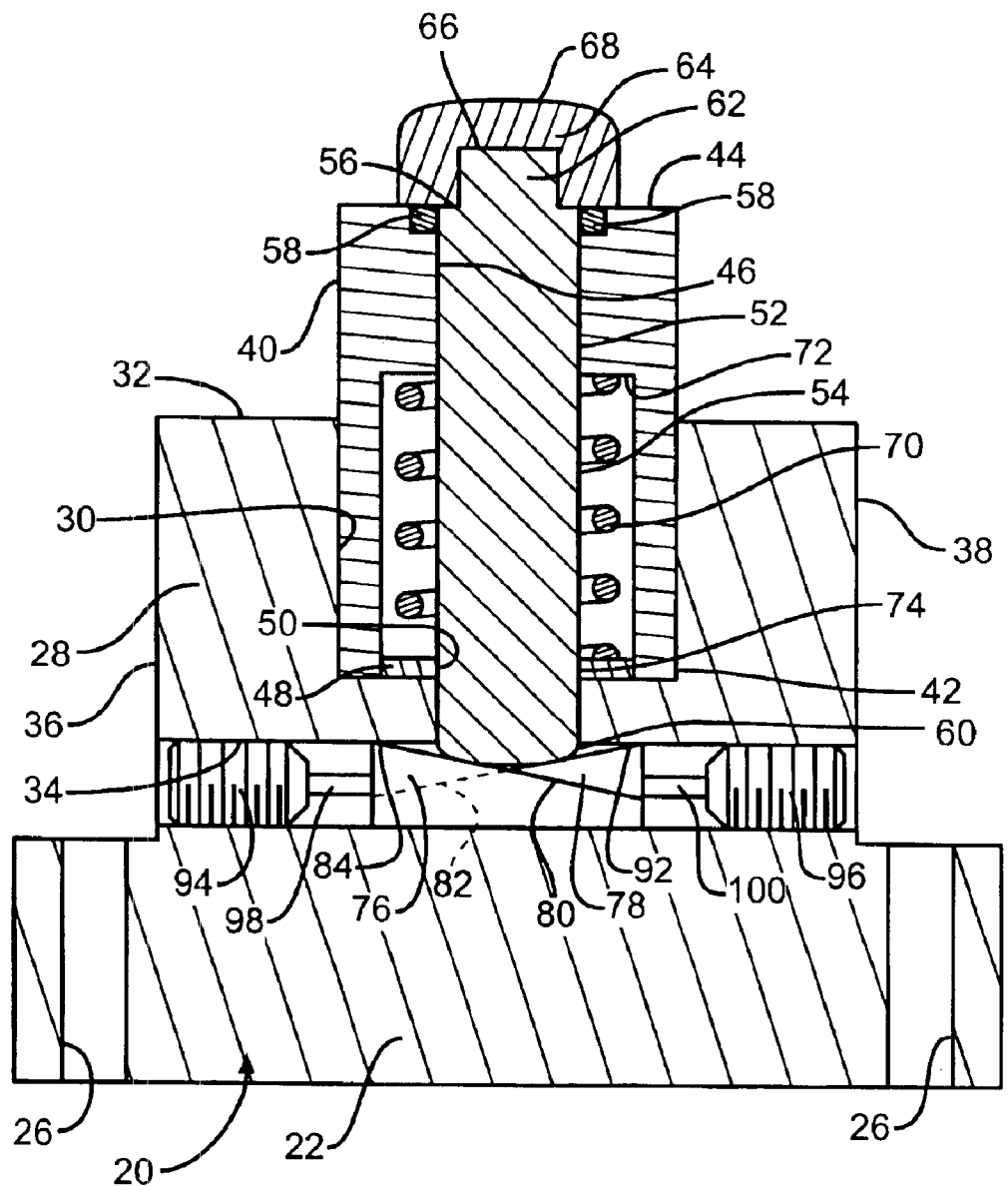
FIG. 2 is a schematic side elevational view of the workpiece support device with its support member in a retracted position.

FIG. 2 illustrates the workpiece support device 10 of the invention in more detail. The workpiece support device 10 includes a body 20. The body 20 includes a base portion 22 which is adapted for mounting on a surface, such as a surface 24 (FIG. 1) beneath a workpiece 12 held by a fixture 14. The base portion 22 can be mounted on the surface 24 by any suitable means, such as by the use of fasteners or by welding. In the embodiment shown, the base portion 22 has a plurality of through holes 26 for the insertion of bolts (not shown) to fasten the base portion 22 to the surface 24. The base portion 22 can be any suitable size and shape for mounting the body 20 on a surface. In the illustrated embodiment, the base portion 22 is rectangular in shape and somewhat longer and wider than the other portions of the body.

The body 20 of the workpiece support device 10 also includes a housing portion 28. The housing portion 28 is adjacent to the base portion 22, and it is formed integrally with or attached to the base portion 22. In the illustrated embodiment, the housing portion 28 is rectangular in shape. The housing portion 28 has a vertical bore 30 formed therein. The vertical bore 30 is relatively large in diameter and cylindrical in shape, and it is centered in the housing portion 28. The vertical bore 30 extends from the upper surface 32 of the housing portion 28 about 70% of the distance to the base portion 22. The housing portion 28 also has a horizontal bore 34 formed therethrough. The horizontal bore 34 extends between opposite sides 36, 38 of the housing portion 28, and it intersects with the lower end of the vertical bore 30.

The body 20 of the workpiece support device 10 also includes a cylindrical chamber 40. The cylindrical chamber 40 is mounted inside the vertical bore 30 in the housing portion 28, and it extends a distance above the upper surface 32 of the housing portion 28. The cylindrical chamber 40 is fixed inside the vertical bore 30 by any suitable means, such as by welding or adhesive. The cylindrical chamber 40 is open at its lower end 42, and it is partially closed at its upper end 44, having a circular opening 46 formed in the center of the upper end 44.

A circular ring 48 is mounted inside the cylindrical chamber 40 near its lower end 42. The ring 48 can be made from any suitable material, such as a relatively high strength metal. The ring 48 has an outer diameter which is equal to the inner diameter of the cylindrical chamber 40. The ring 48 is fixed inside the cylindrical chamber 40 by any suitable means. The ring 48 has a circular opening 50 formed in its center. The diameter of the circular opening 50 in the ring 48 is the same as the diameter of the circular opening 46 in the upper end 44 of the cylindrical chamber 40.

Figure 3:
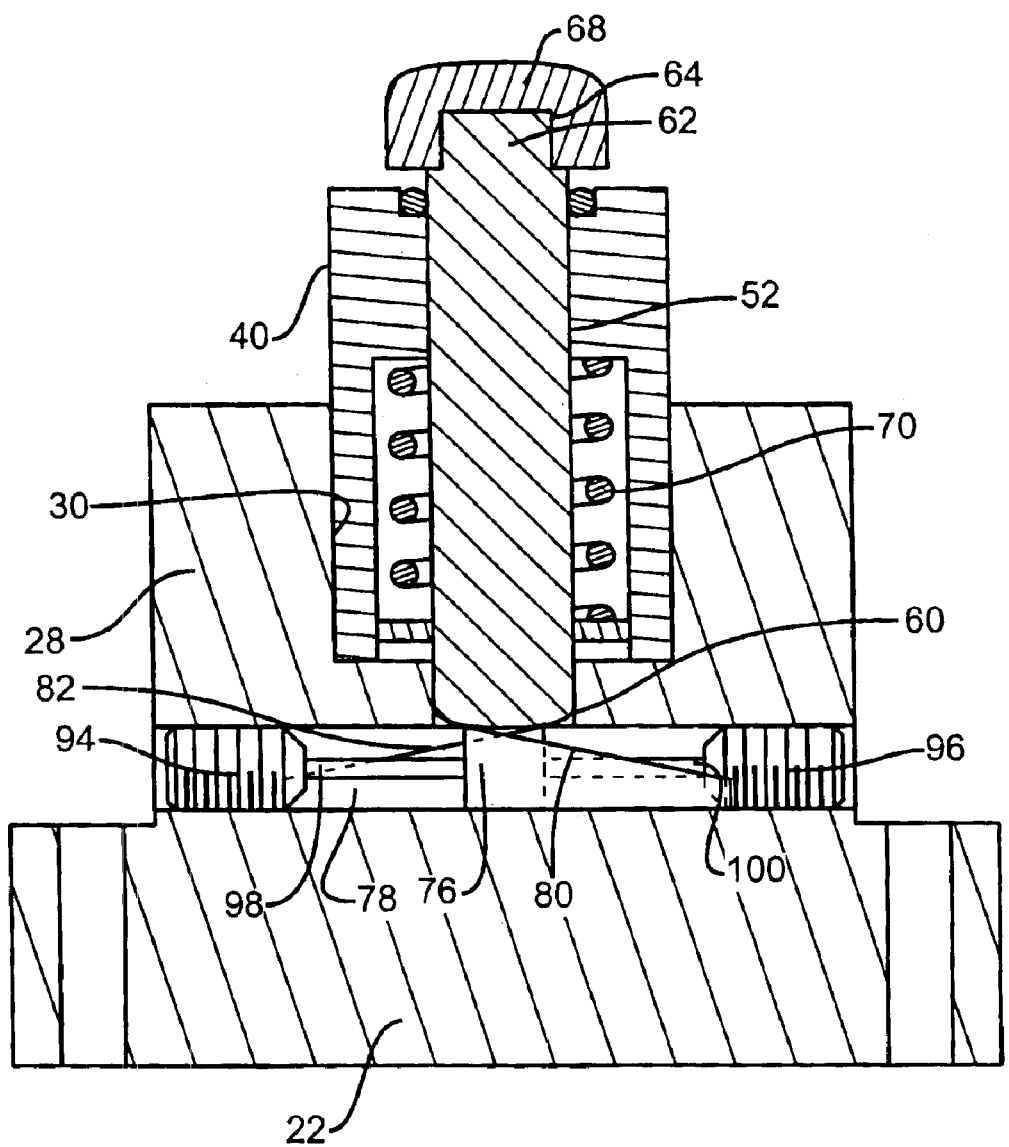
FIG. 3 is a schematic side elevational view of the workpiece support device with its support member in an extended position.

A support member 52 or plunger is telescopically received inside the cylindrical chamber 40. The support member 52 includes a cylindrical shaft portion 54. The shaft portion 54 has a diameter slightly less than the diameters of the circular openings 50 and 48 in the ring 48 and the upper end 44 of the cylindrical chamber 40, so that the shaft portion 54 can extend through the openings. The upper end 56 of the shaft portion 54 is supported by a plurality of bearings 58 (two of which are shown) inside the upper end 44 of the cylindrical chamber 40. The support member 52 is extendable outward relative to the body 20 (upward in the illustrated embodiment) and away from the base portion 22. The support member 52 is also retractable inward relative to the body 20 (downward in the illustrated embodiment) and toward the base portion 22. FIG. 2 shows the support member 52 in a retracted position, while FIG. 3 shows the support member 52 in an extended position. The shaft portion 54 of the support member 52 has a rounded lower end 60. The shaft portion 54 of the support member 52 includes a reduced diameter upper portion 62. The upper portion 62 extends above the cylindrical chamber 40. A rest portion 64 or nose piece of the support member 52 is removably attached to the reduced diameter upper portion 62. The rest portion 64 can be removably attached by any suitable means. In the illustrated embodiment, the rest portion 64 has a cylindrical bore 66 which is sized to receive the reduced diameter upper portion 62 of the shaft portion 54. The bore 66 and the reduced diameter upper portion 62 can both be threaded (not shown), or one or more removable fasteners can be inserted into corresponding holes/openings (not shown) in the rest portion 64 and the reduced diameter upper portion 62. The rest portion 64 could also be permanently attached to, or formed integrally with, the shaft portion 54 of the support member 52.

The rest portion 64 of the support member 52 is adapted for supporting a workpiece 12 during a machining operation. The illustrated rest portion 64 has a rounded upper surface 68 for supporting the workpiece 12, but the use of a removable rest portion 64 allows it to be replaced by another rest portion having a different shape and/or size depending on the particular support requirements.

Preferably, the workpiece support device 10 also includes a spring member 70 mounted on the body 20 which forces the support member 52 inward relative to the body 20 (downward in the embodiment shown). The spring member 70 can be any type of device suitable for forcing the support member 52 inward. In the illustrated embodiment, the spring member 70 is a compression spring having an upper end 72 which is attached to the shaft portion 54 of the support member 52, and having a lower end 74 which is attached to the ring 48 mounted inside the lower portion of the cylindrical chamber 40. When the support member 52 is extended upward relative to the body 20, the spring 70 pulls the support member 52 downward.

The workpiece support device 10 also includes at least one cam member 76. In the preferred embodiment shown, the workpiece support device 10 includes first and second cam members 76 and 78. The cam members 76 and 78 are mounted on the body 20 so as to be movable between first and second positions relative to one another. In the illustrated embodiment, the cam members 76 and 78 are positioned in the horizontal bore 34 in the housing portion 28 of the body 20, and are movable back and forth inside the bore 34. FIG. 2 shows the cam members 76 and 78 in a first position relative to one another, and FIG. 3 shows the cam members 76 and 78 in a second position relative to one another.

Figure 4:
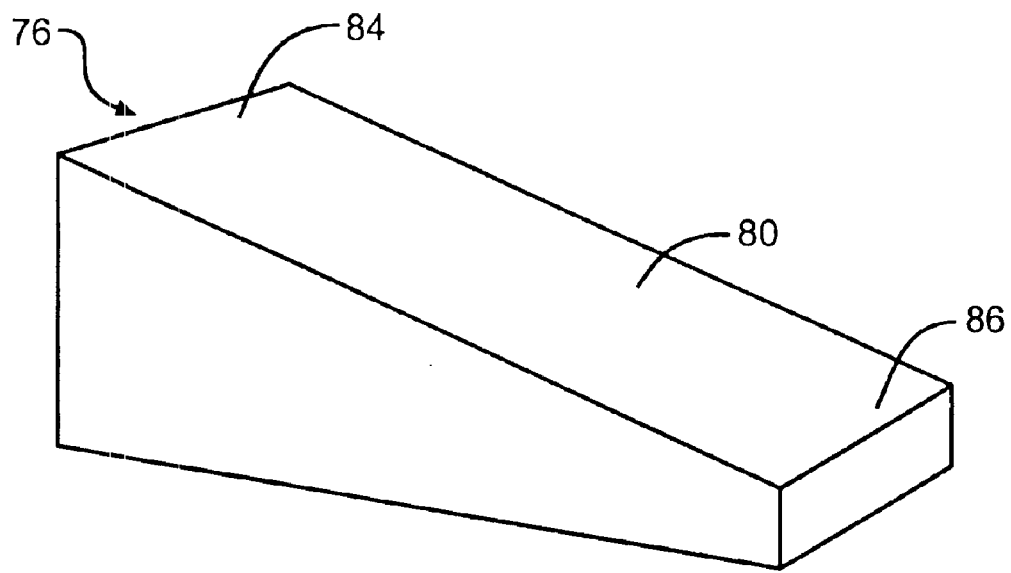
FIG. 4 is a perspective view of a first embodiment of a cam member of the workpiece support device.
Figure 5:
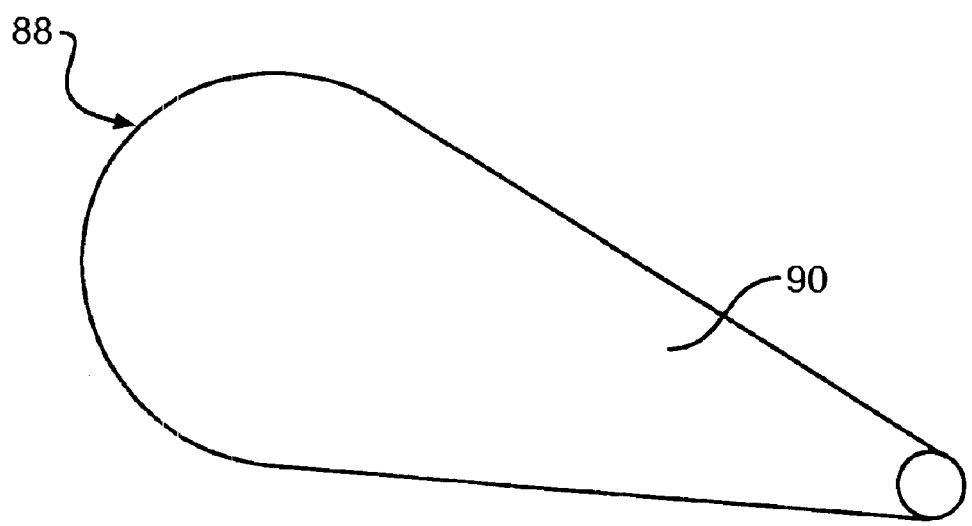
FIG. 5 is a perspective view of a second embodiment of a cam member of the workpiece support device.

The cam members 76 and 78 have outward (upward) facing camming surfaces 80 and 82. In the illustrated embodiment, the cam members 76 and 78 are generally wedge-shaped and the camming surfaces 80 and 82 are tapered surfaces. One of the wedge-shaped cam members 76 is shown in more detail in FIG. 4. The cam member 76 is triangular as viewed from the side, having a high end 84 and a low end 86. A tapered camming surface 80 extends between the high and low ends 84 and 86. The cam member 76 is rectangular as viewed from the top. FIG. 5 shows another embodiment of a cam member 88 for use in the workpiece support device 10. The cam member 88 is generally conical in shape, and it has an outer camming surface 90. The cam members 76 and 78 and the camming surfaces 80 and 82 can be any shape suitable for their intended purpose, as described below.

The housing portion 28 and the base portion 22 of the body 20, the cylindrical chamber 40, the support member 52, and the cam members 76 and 78, can be made from any suitable material, such as a relatively high strength metal.

The movement of the cam members 76 and 78 between the first position (FIG. 2) and the second position (FIG. 3) causes the camming surfaces 80 and 82 to cooperate to drivingly engage the inner (lower) end 60 of the support member 52 and force the support member 52 to extend outward (upward) relative to the body 20. As shown in FIG. 2, the wedge-shaped cam members 76 and 78 are positioned adjacent to one another, and their high ends 84 and 92 are on opposite sides. The spring 70 urges the support member 52 downward so that the rounded lower end 60 of the support member 52 rests on top of the adjacent camming surfaces 76 and 78. As shown in FIG. 3, the cam members 76 and 78 have moved in opposite directions relative to one another (cam member 76 has moved to the right and cam member 78 has moved to the left) so that the high ends 84 and 92 of the cam members 76 and 78 are brought closer together. This causes the camming surfaces 80 and 82 to cooperate to build height relative to the lower end 60 of the support member 52, and to thereby drivingly engage the lower end 60 of the support member 52 and force the support member 52 upward.

The workpiece support device 10 further includes at least one actuator which when turned on forces the at least one cam member to move between the first position and the second position, thereby forcing the support member 52 to move upward. In the preferred embodiment shown, the workpiece support device 10 includes first and second actuators 94 and 96 which apply force to the first and second cam members 76 and 78, respectively. Preferably, the actuators 94 and 96 are hydraulic cylinders having extendable pistons 98 and 100, and the cam members 76 and 78 are attached to the pistons 98 and 100. When the hydraulic cylinders 94 and 96 are actuated, the pistons 98 and 100 extend from the cylinders and force the cam members 76 and 78 from the first position to the second position.

Unlike typical workpiece support devices, the workpiece support device 10 of this invention does not include a locking sleeve to lock the support member 52 in place. As a result, the upwardly forced support member 52 applies continuous upward pressure against the lower surface of the workpiece 12 during the machining operation, to counter the downward pressure applied by the machining tool on the upper surface. The continuous upward pressure against the workpiece 12 significantly reduces or eliminates the occurrence of vibration and chatter during machining. In addition, the exclusion of a locking sleeve and the mechanical-type operation of the workpiece support device 10 makes it less susceptible to contaminants.

After the machining operation is completed, the support member 52 can be lowered to allow removal of the machined workpiece 12 and placement of the next workpiece in the fixture. Movement of the cam members 76 and 78 between the second position (FIG. 3) and the first position (FIG. 2) allows the support member 52 to retract inward (downward) relative to the body 20. In the illustrated embodiment, the pistons 98 and 100 of the hydraulic cylinders 94 and 96 are retracted into the cylinders, which causes the cam members 76 and 78 to move between the second position and the first position. The cooperating camming surfaces 80 and 82 lose height relative to the lower end 60 of the support member 52. As a result, the support member 52 is allowed to move downward under the urging of the spring 70.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope. For example, although the body 20, the support member 52, and the cam members 76 and 78 of the workpiece support device 10 have been illustrated as having particular shapes and sizes, it is recognized that they can have other shapes and sizes suitable for their intended purpose. Further, although the workpiece support device 10 is illustrated as being mounted in a particular orientation, it could also be mounted in other orientations. In such situations, the support member 52 would move in a direction other than upward when extended from the body 20, and in a direction other than downward when retracted into the body 20. Although the illustrated embodiment shows the base portion 22 of the body 20 to be a separate portion from the housing portion 28, the base portion could also be part of the housing portion.

What is claimed is:

1. A workpiece support device comprising:
    a body including a base portion adapted for mounting on a surface;
    a support member mounted on the body so as to be extendable outward relative to the body and away from the base portion, and retractable inward relative to the body and toward the base portion, the support member having an outer end adapted for supporting a workpiece and having an inner end;
    a cam member having a camming surface, the cam member mounted on the body so as to be movable in first and second directions, the movement of the cam member in the first direction causing the camming surface to drivingly engage the inner end of the support member and force the support member to extend outward relative to the body, and the movement of the cam member in the second direction allowing the support member to retract inward relative to the body; and
    a hydraulic cylinder actuator having an extendable piston which when turned on forces the cam member in the first direction, thereby forcing the support member to extend outward relative to the body and which is operative to apply a continuous outward pressure against the workpiece for as long as said hydraulic cylinder actuator is turned on to thereby counter a downward pressure applied by a machining tool to thereby reduce the occurrence of vibration during machining of the workpiece.

2. A workpiece support device according to claim 1 wherein the cam member is generally wedge-shaped, and wherein the camming surface is a tapered surface.

3. A workpiece support device according to claim 1 further comprising a spring member mounted on the body which forces the support member inward relative to the body.

4. A workpiece support device according to claim 1 wherein the cam member is attached to the piston.

5. A workpiece support device according to claim 2 wherein the wedge-shaped cam member is generally triangular in shape.

6. A workpiece support device according to claim 2 wherein the wedge-shaped cam member is generally conical in shape.

7. A workpiece support device comprising:
    a body including a base portion adapted for mounting on a surface;
    a support member mounted on the body so as to be extendable outward relative to the body and away from the base portion, and retractable inward relative to the body and toward the base portion, the support member having an outer end adapted for supporting a workpiece and having an inner end;

first and second cam members each having a camming surface, the cam members mounted on the body so as to be movable between first and second positions relative to one another, the movement of the cam members between the first position and the second position causing the camming surfaces to cooperate to drivingly engage the inner end of the support member and force the support member to extend outward relative to the body, and the movement of the cam members between the second position and the first position allowing the support member to retract inward relative to the body; and at least one hydraulic cylinder actuator having an extendable piston which when turned on forces the cam members to move between the first position and the second position, thereby forcing the support member to extend outward relative to the body, and which is operative to apply a continuous outward pressure against the workpiece for as long as said hydraulic cylinder actuator is turned on to thereby counter a downward pressure applied by a machining tool to thereby reduce the occurrence of vibration during machining of the workpiece.

8. A workpiece support device according to claim 7 wherein the movement of the cam members between the first position and the second position causes the camming surfaces to cooperate to build height relative to the inner end of the support member to thereby drivingly engage the inner end of the support member and force the support member to extend outward relative to the body.

9. A workpiece support device according to claim 7 wherein the movement of the cam members between the first position and the second position comprises movement of the cam members in generally opposite directions relative to one another.

10. A workpiece support device according to claim 7 wherein the cam members are generally wedge-shaped, and wherein the camming surfaces are tapered surfaces.

11. A workpiece support device according to claim 7 further comprising a spring member mounted on the body which forces the support member inward relative to the body.

12. A workpiece support device according to claim 7 wherein the at least one hydraulic cylinder actuator comprises first and second hydraulic cylinder actuators having extendable pistons, and wherein the cam members are attached to the pistons.

13. A workpiece support device according to claim 7 wherein the outer end of the support member comprises a removable rest portion.

14. A workpiece support device comprising:

a body having a base portion for mounting on a surface beneath a workpiece held by a fixture, the body including a housing portion adjacent the base portion, the housing portion having a vertical bore formed therein and a horizontal bore formed therethrough, the horizontal bore extending between opposite sides of the housing portion and intersecting a lower end of the vertical bore;

a cylindrical chamber mounted inside the vertical bore in the housing portion, the chamber extending above an upper surface of the housing portion, the cylindrical chamber having an opened lowered end and a partially closed upper end having an opening formed therein;

a circular ring mounted inside the cylindrical chamber near the lower end thereof, the ring having an outer diameter which is generally equal to an inner diameter of the cylindrical chamber, the ring having a circular opening formed therein, the diameter of the circular opening in the ring being generally the same as the diameter of the opening in the upper end of the cylindrical chamber;

a support member telescopically received inside the cylindrical chamber for supporting the workpiece during a machining operation, the support member including a cylindrical shaft portion having a diameter slightly less than the diameters of the openings in the ring and the upper end of the cylindrical chamber so that the cylindrical shaft portion extends therethrough, the support member extendable outward relative to the body and away from the base portion and retractable inward relative to the body and toward the base portion;

a spring member mounted on the body which is operative to force the support member inward relative to the body;

a first cam member and a second cam member disposed in the horizontal bore in the housing portion of the body and movable inside the horizontal bore between first and second positions relative to one another, each of the first and second cam members having a camming surface, wherein the movement of the first and second cam members between the first position and the second position causes the camming surfaces to cooperate to drivingly engage an inner end of the support member and force the support member to extend outward relative to the body; and a first hydraulic cylinder actuator and a second hydraulic cylinder actuator which when turned on forces the first cam member and the second cam member, respectively, to move between the first position and the second position thereby forcing the support member to move outward relative to the body, wherein each of the first and second hydraulic cylinder actuators having an extendable piston which is operatively connected to the first and second cam members such that when the first and second hydraulic cylinder actuators are actuated, the pistons extend from the first and second hydraulic cylinder actuators and force the cam members from the first position to the second position.

15. The workpiece support device according to claim 14 wherein the vertical bore having a cylindrical shape, centered in the housing portion, and extending from an upper surface of the housing portion about 70% of the distance to the base portion.

16. The workpiece support device according to claim 14 wherein an upper end of the shaft portion is supported by a plurality of bearings disposed inside the upper end of the cylindrical chamber.

17. The workpiece support device according to claim 14 wherein the shaft portion of the support member has a rounded lower end and a reduced diameter upper portion, the upper portion extending above the cylindrical chamber.

18. The workpiece support device according to claim 14 wherein the spring member is a compression spring having an upper end attached to the shaft portion of the support member and having a lower end attached to the ring mounted inside the lower portion of the cylindrical chamber so that when the support member is extended outward relative to the body, the spring pulls the support member inward.

19. The workpiece support device according to claim 14 wherein the first and second cam members are generally wedge-shaped and the camming surfaces are tapered surfaces.

20. The workpiece support device according to claim 14 wherein the first and second cam members are positioned adjacent to one another with the high ends thereof on opposite sides, the spring member urges the support member inward so that the inner end of the support member rests on top of the adjacent camming surfaces, wherein during movement of the cam members from the first position to the second position causes the first and second cam members to move in opposite directions relative to one another so that the high ends of the first and second cam members are brought closer together causes the camming surfaces to cooperate to build height relative to the inner end of the support member to thereby drivingly engage the inner end of the support member and force the support member outward relative to the body.

21. The workpiece support device according to claim 14 wherein the first and second cam members are generally conical in shape.

\* \* \* \* \*